United States Patent [19]

Treger

[11] Patent Number: 5,355,089
[45] Date of Patent: * Oct. 11, 1994

[54] MOISTURE BARRIER FOR BATTERY WITH ELECTROCHEMICAL TESTER

[75] Inventor: Jack Treger, Milton, Mass.

[73] Assignee: Duracell Inc., Bethel, Conn.

[ * ] Notice: The portion of the term of this patent subsequent to Oct. 5, 2010 has been disclaimed.

[21] Appl. No.: 914,943

[22] Filed: Jul. 22, 1992

[51] Int. Cl.⁵ .................................. G01N 27/416
[52] U.S. Cl. .................................. 324/435; 320/48; 340/636
[58] Field of Search .................. 73/440; 320/48; 324/104, 426, 433, 435; 340/636; 429/90, 91, 92, 93

[56] References Cited

U.S. PATENT DOCUMENTS

| | | | |
|---|---|---|---|
| 1,497,388 | 6/1924 | Sterling | 429/50 |
| 2,980,754 | 4/1961 | Reilly | 429/91 |
| 3,514,338 | 5/1970 | Shakour | 429/90 |
| 3,563,806 | 2/1971 | Hruden | 429/90 |
| 3,773,563 | 11/1973 | Eaton | 429/91 |
| 3,992,228 | 11/1976 | Depoix | 429/90 |
| 4,006,414 | 2/1977 | Parker | 324/106 |
| 4,048,388 | 9/1977 | Chevet | 429/91 |
| 4,052,695 | 10/1977 | Myers | 340/431 |
| 4,408,194 | 10/1983 | Thomson | 340/626 |
| 4,497,881 | 2/1985 | Bertolino | 429/91 |
| 4,543,304 | 9/1985 | DeHaan | 429/92 |
| 4,702,564 | 10/1987 | Parker | 359/44 |
| 4,723,656 | 2/1988 | Kiernan | 206/333 |
| 4,726,661 | 2/1988 | Parker | 359/44 |
| 4,737,020 | 4/1988 | Parker | 359/87 |
| 4,835,475 | 5/1989 | Hanakura | 324/435 |
| 4,835,476 | 5/1989 | Kurosawa | 324/435 |
| 5,005,410 | 4/1991 | Webster | 73/335.02 |
| 5,015,544 | 5/1991 | Burroughs | 429/93 |
| 5,059,895 | 10/1991 | Cataldi | 324/104 |
| 5,156,931 | 10/1992 | Burroughs et al. | 429/93 |
| 5,250,905 | 10/1993 | Kuo et al. | 324/435 |

*Primary Examiner*—Kenneth A. Wieder
*Assistant Examiner*—Christopher M. Tobin
*Attorney, Agent, or Firm*—Ronald S. Cornell; Edward M. Corcoran; Barry D. Josephs

[57] ABSTRACT

The combination of a main electrochemical cell (or battery cell) and a battery tester connected to the cell is disclosed. The battery tester is moisture sensitive, typically of the electrochemical type having a film-like construction comprising an anode layer, a cathode layer and electrolyte layer therebetween. The tester may be applied against the cell's outer surface. A moisture vapor barrier film is applied over the tester and adhesively secured to the cell's surface. The moisture barrier film is flexible, optically clear or at least translucent, and has a very low moisture vapor transmission rate. The moisture vapor barrier is preferably composed of mica film, but may desirably also be a film of polyparaxylylene or glass coated polymer. A hydrophobic hot melt, solvent-based or reactive thermosetting adhesive may be employed to bond the moisture vapor barrier film to the cell's surface. The moisture barrier film prevents ambient moisture from passing to the tester and interfering with its operation.

25 Claims, 2 Drawing Sheets

MOISTURE BARRIER FOR BATTERY WITH ELECTROCHEMICAL TESTER

The invention relates to moisture barriers for protecting battery condition indicators from exposure to ambient moisture. In particular, the present invention pertains to moisture barriers comprising a film and an adhesive.

Battery condition indicators (hereinafter referred to as "battery testers") which are designed to indicate the condition of an electrochemical cell or battery are known. Battery testers permit the user to visually determine whether a cell needs to be replaced. A preferred type of battery tester typically is of film-like construction which may be kept separate from the cell or battery until use or may be physically attached thereto. Early battery testers sometimes required the presence of moisture as described in U.S. Pat. No. 1,497,388 (Sterling) which discloses a tester having a carrier impregnated with phenolphthalein. This tester changed color depending on the amount of current that passed through it when water was added to the carrier. Presently, battery testers may advantageously be of the thermochromic type as disclosed, for example, in U.S. Pat. No. 4,702,564 (Parker) or, more preferably, of the electrochemical-type as disclosed in the present patent application and in commonly assigned U.S. patent application Ser. No. 07/764,610 (U.S. Pat. No. 5,250,905) filed Sept. 24, 1991. The thermochromic-type tester comprises a thermochromic material in thermal contact with an electrically resistive element that is electrically connected in series to a cell during the voltage measurement. The thermochromic material changes color in response to the heat generated by the resistive element due to $I^2R$ heating. The amount of heat generated is proportional to the current flowing through the resistive element which, in turn, is proportional to the cell voltage. Thus, the color change of the thermochromic material can be calibrated to be responsive to preselected voltage values. A thermochromic type indicator cell which is separate from, that is, not attached to the primary battery cell is disclosed in U.S. Pat. No. 4,723,656 (Kiernan). The tester disclosed in this latter reference can be connected at any time to a cell to measure its voltage. Alternatively, the thermochromic tester can be manufactured already attached to the cell as disclosed in commonly assigned U.S. patent application Ser. No. 07/730,712 filed Jul. 16, 1991 and in U.S. Pat. No. 5,059,895 (Cataldi). Other examples of thermochromic-type testers are discussed in U.S. Pat. Nos. 4,835,476; 4,726,661; 4,835,475; 4,737,020; 4,006,414; 4,723,656; and U.S. patent application Ser. No. 652,165 (U.S. Pat. No. 5,128,616) filed Feb. 7, 1991 commonly assigned with the present patent application.

A disadvantage of the thermochromic-type tester is that when the tester is fixed to a cell's outer surface, a switch must also be employed. The inclusion of a switch complicates and increases the cost of manufacture. The electrochemical-type tester, by contrast, acts as a "fuel guage" and provides a continuous reading of the state of charge. It is effectively a miniature electrochemical cell which is connected in parallel to the main cell and is designed to reflect the present voltage of the main cell by indicating its own state of depletion.

Electrochemical-type testers are preferred because they give a continuous voltage reading and can be attached to a cell without needing a switch. They are preferably of thin film-like construction so they can be attached to the cell outer surface without noticeably adding to the cell diameter. This is described in the present application and in commonly assigned U.S. patent application Ser. No. 07/764,610, (U.S. Pat. No. 5,250,905) filed Sep. 24, 1991 herein incorporated by reference. Electrochemical-type battery testers may be particularly sensitive to water vapor, since they often contain one or more layers of water sensitive materials that function as miniature electrodes or electrolytic layers. If such water sensitive materials are employed, as is likely the case, it becomes necessary to provide a clear, highly effective moisture barrier over the tester to minimize entry of detrimental ambient water vapor or egress of organic vapors over the desired shelf-life period and yet not obstruct visibility of the tester surface.

A difficulty in providing an effective moisture barrier seal over electrochemical-type testers is that the barrier's moisture vapor transmission rate must be very low, the barrier must be optically clear or at least translucent to permit an unobstructed view of the tester, and it must also be very thin and flexible or it will be difficult to install or will add noticeably to the cell diameter. Heretofore, an effective moisture barrier meeting all of these requirements simultaneously has been unavailable for electrochemical-type battery testers having stringent moisture barrier requirements.

Several prior art references disclose the use of windows through a cell casing to permit a view of the state of an internal component, e.g., a change in color of electrolyte, as the battery is depleted. Representative prior art references are U.S. Pat. Nos. 3,563,806; 4,497,881; 3,992,228 and 4,048,388. The window materials disclosed in these references do not have the requisite properties that would permit their use as an effective moisture barrier seal in the context of the present invention.

In a principal aspect, the present invention is directed to providing an optically clear or at least translucent moisture barrier covering moisture sensitive battery testers (cell condition indicators), particularly electrochemical-type testers which can be permanently connected to an electrochemical cell's (or battery cell's) outer surface. Such testers are typically thin, in the form of a film-like laminate and are designed to indicate whether the electrochemical cell (or battery) needs to be replaced. In accordance with the present invention, a moisture barrier is provided that prevents ambient water vapor and other organic vapors from penetrating in quantities measurably significant enough to interfere with the proper functioning of the voltage tester.

The moisture vapor barrier of the invention is preferably in the form of flexible, thin, optically clear or at least translucent film that has a low moisture vapor transmission rate of less than 0.02 gm $H_2O \times$ mm thickness/($m^2 \times 24$ hrs), preferably less than 0.0004 gm $H_2O \times$ mm/($m^2 \times 24$ hrs). The moisture barrier film advantageously has a thickness of less than 5 mils (0.13 mm), preferably less than 2 mils (0.05 mm) and more preferably between 0.1 and 2 mils (0.0025 and 0.05 mm).

A conventional clear, moisture resistant film such as "ACLAR" film (Allied Signal Corp.) which is a fluorohalocarbon film used as a clear seal for electronic displays, e.g. liquid crystal displays (LCD), provides inadequate protection for electrochemical-type testers. ("ACLAR" film has a moisture vapor transmission rate no less than about 0.03 gm $H_2O \times$ mm/($m^2 \times 24$ hrs).) Conventional carbon based polymeric films that are considered to be moisture resistant, such as polyethylene, polypropylene, polyesterterephthalate (MYLAR), polyvinylchloride and polyvinylidene chloride (SARAN) all have moisture vapor transmission rates which are above 0.02 gm $H_2O \times mm/(m^2 \times 24$ hrs) and therefore would provide inadequate protection for electrochemical cells. A preferred moisture vapor barrier film satisfying the aforementioned requirements is formed of sheets of the naturally occurring mineral mica, for example muscovite mica. Other types of mica which are satisfactory include phlogopite, biotite, lepidolite, roscoelite, fuchsite, fluorophlogopite, and paragonite. Alternatively, the moisture barrier film may be composed of polyparaxylylene or glass coated polymeric film, preferably glass coated polypropylene film. The glasses that may be employed in glass coated polymeric film for the moisture barrier film include soda-lime, borosilicate, aluminosilicate, lead glass, borate glasses, phosphate glasses, vitreous-silicia and fluorophosphate glasses, such as lead-tin fluorophosphate.

In an important aspect of the invention the moisture barrier film covers a film-like battery tester, preferably an electrochemical-type tester as described below, which is in contact with the outer surface of an electrochemical cell or battery (e.g., the battery case). The moisture vapor barrier film may be placed over the electrochemical tester. A hydrophobic adhesive may be employed to bond the moisture barrier film to the cell's outer surface. The adhesive may be applied around a border of the side of the moisture barrier film which faces the cell's outer surface. The adhesive coated film then may be bonded to the cell's outer surface along the border of adhesive coating. The moisture barrier film tightly covers the battery tester and holds the tester against the battery surface.

The hydrophobic adhesive for bonding the moisture vapor barrier film to the primary battery cell wall advantageously has a relatively low moisture vapor transmission rate, preferably less than 2 gm $H_2O \times mm/(m^2 \times 24$ hrs), more preferably less than 0.2 gm $H_2O \times mm/(m^2 \times 24$ hrs). The moisture vapor transmission rate of the adhesive does not have to be as low as that of the film because the diffusion path length through the adhesive can be greater than the diffusion path length through the film.

Suitable adhesives having the aforementioned properties may be selected from a variety of hot melt adhesives, for example, hot melt polyolefinic adhesives containing homopolymers or copolymers of polyethylene, polypropylene, polybutene and polyhexene and mixtures thereof. Alternatively hydrophobic solvent based adhesives having the desired low moisture vapor transmission rates may be employed. Such adhesives are preferably rubber based adhesives containing, for example, rubber based components such as butyl, polychloroprene ("NEOPRENE"), nitrile, polyisoprene, polyisobutylene, polysulfide, styrene-butadiene, styrene-isoprene-styrene(SIS) block copolymers, styrene-butadiene-styrene(SBS) block copolymers, acrylonitrile-styrene-butadiene(ASB) block copolymer and mixtures thereof. The hydrophobic adhesive may also be selected from the class of olefinic thermosetting polymeric adhesives. A particularly suitable adhesive from this class is polybutadiene which may be cured effectively using benzoyl peroxide.

The features and advantages of the present invention are described below with reference to the accompanying drawings in which.

Figure 1:
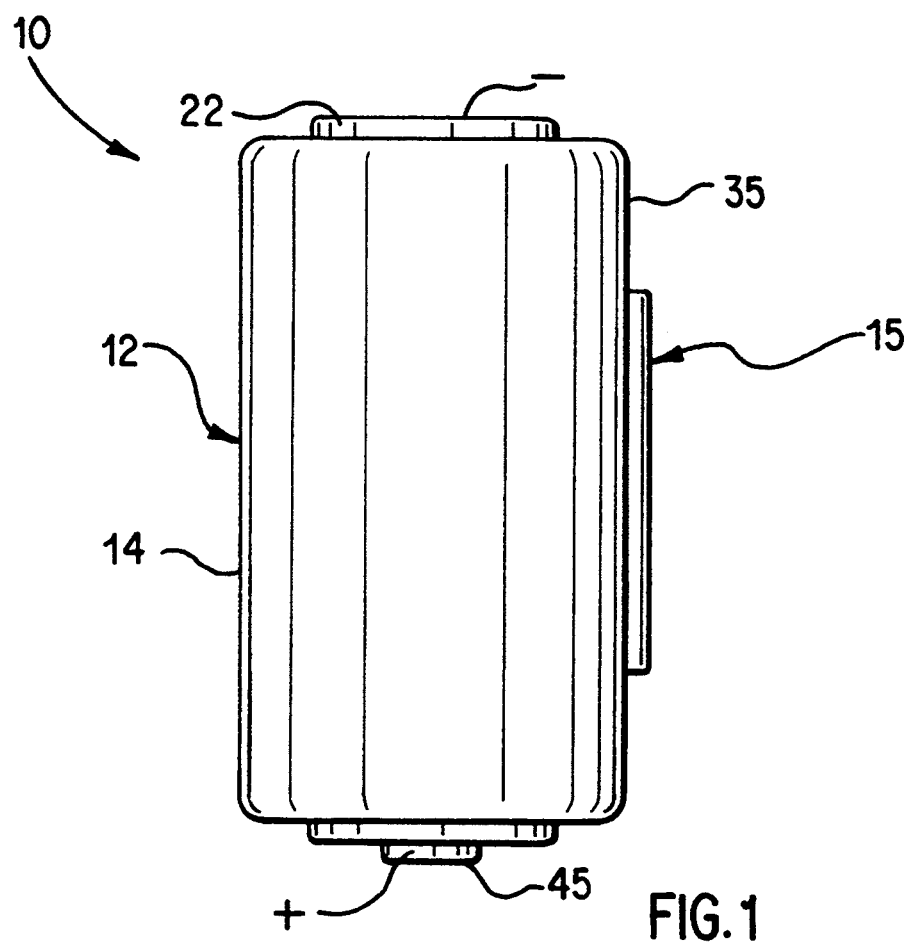
FIG. 1 is an elevational view of an electrochemical cell with attached battery tester shown enlarged.
Figure 1A:
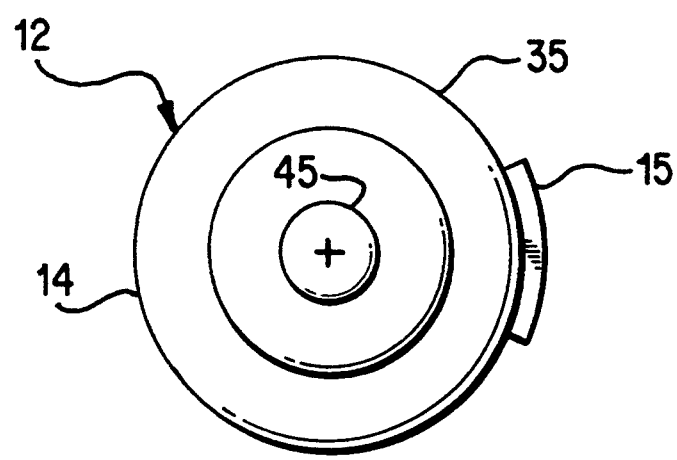
FIG. 1A is an end view of the cell illustrated in FIG. 1.

The combination 10 of the invention comprises a cell 12 and an attached battery tester (cell condition indicator) 15. Cell 12 may be any type of electrochemical cell whatsoever, non-limiting examples of which include alkaline cells, lithium cells, and zinc-air cells. Battery tester 15 is preferably an electrochemical-type which is designed to measure the voltage of cell 12 and visually indicate to the user whether cell 12 needs to be replaced. The internal components of tester 15 are typically sensitive to water vapor and can lose their electrochemical properties if exposed to ambient moisture. It is therefore important to provide an adequate moisture barrier seal to protect the indicator components.

Cell 12 may be any type of cell as described above and generally comprises a cylindrical cell case 14, negative terminal 22 and a positive terminal 45. In the specific embodiment herein, cell 12 is an alkaline cell wherein positive terminal 45 is an end portion of case 14 and negative terminal 22 is a portion of cover (not shown) that seals case 14.

Battery-tester 15 is attached to case 14 and is electrically connected between terminals 22 and 45. Tester 15 is preferably an eletrochemical-type which has a film-like construction having a thickness of less than 10 mils (0.25 mm) and preferably less than 5 mils (0.13 mm). Since tester 15 is very thin, it does not measurably add to the overall diameter of battery 12, even though it is secured to the cell outer surface 35. This of course is an important feature, otherwise the cell size would have to be reduced to accommodate tester 15.

The preferred tester 15 is in effect a miniature electrochemical cell connected in parallel to main cell 12. Preferred tester 15 is composed of thin layers of material 40 and 60 which function as a miniature cathode and anode, respectively, with a correspondingly thin layer of electrolytic material 50 interposed therebetween. In the preferred embodiment illustrated in FIG. 2 cathode layer 40 is disposed on the rear side of tester 15 and is in electrical contact with a portion of the cell's outer surface which may typically be made of nickel-plated steel. For the alkaline cell shown in FIG. 2 case 14 is at the cathode potential. In one embodiment cathode layer 40 is in physical contact with case 14 thus making electrical contact therewith. Anode layer 60 preferably is disposed towards the outer surface of tester 15, away from cell wall 35. Anode layer 60 is electrically connected to the negative terminal 22 by a conducive means 62. Conductive means 62 can be any thin electrical conductor, such as a wire, that is insulated from connecting case 14. Tester 15 is thus electrically connected in parallel to main cell 12.

Figure 2:
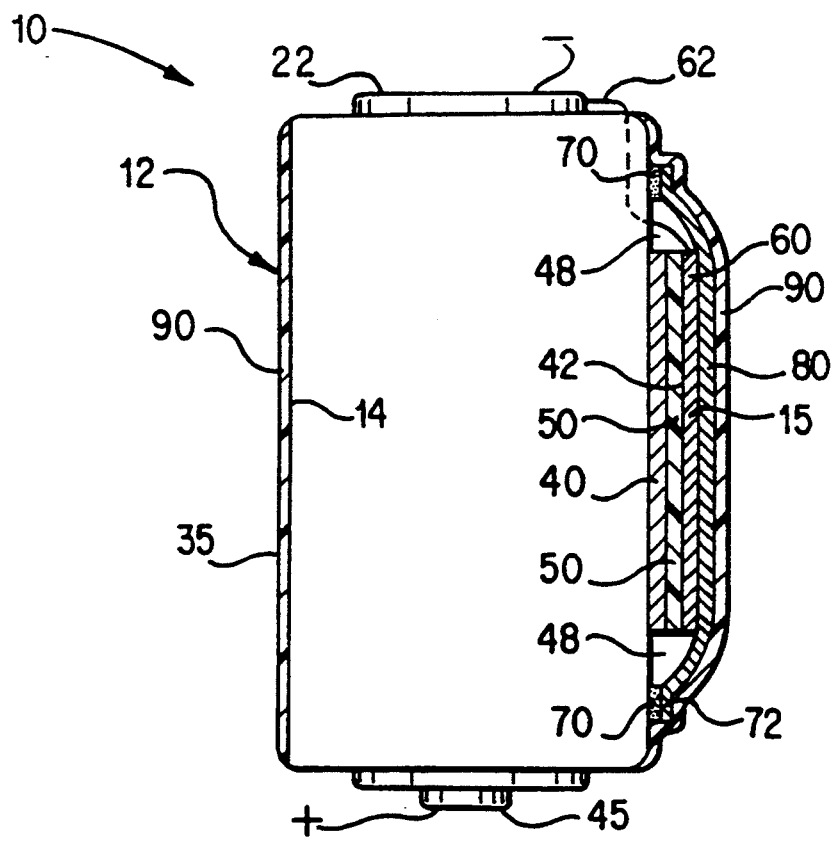
FIG. 2 is a longitudinal sectional view of a cell and an enlarged schematic sectional view of an attached battery tester.

In the preferred embodiment illustrated in FIG. 2 the tester anode layer 60 may be a thin layer of zinc which is deposited onto a polyester ("MYLAR") film using any vacuum vapor technique, electrolysis deposition and the like. The zinc layer may be about 0.06 micron thick and the polyester ("MYLAR") film about 1 mil (0.025 mm) thick. Cathode layer 40 may preferably be a thin layer of manganese dioxide typically about 2 mils (0.05 mm) thick and the electrolyte 50 may be a thin layer of about 1 mil (0.025 mm) thick. The electrolyte 50 may be an aprotic organic electrolyte such as 0.5M lithium trifluorosulphonate in a solvent mixture of ethylene carbonate: propylene carbonate: polyvinylidene fluoride (2.4: 2.4:5.2 parts by volume). An indicia layer, preferably, a fluorescent coating 42 forms the interface between electrolytic layer 50 and the anode layer 60. The operation of tester 15 is such that as the main cell 12 discharges on use, the "miniature cell" of tester 15 also discharges in a proportional amount. As tester 15 discharges, the thin layer of zinc comprising anode 60 disintegrates. Anode layer 60 eventually disintegrates to the point that the underlying fluorescent coating 42 becomes visible, thus, alerting the user that main cell 12 is nearly discharged and needs to be replaced.

Tester 15 should be kept thin, preferably having a thickness of less than about 10 mils (0.25 mm), more preferably less than about 5 mils (0.13 mm). Anode layer 60 must be of a predetermined thickness such that it disintegrates enough to make visible underlying fluorescent coating 42 at the time that main cell 12 has become sufficiently discharged, that is, has undergone a sufficient drop in voltage to warrant replacement.

It is very desirable to provide a moisture barrier seal around indicator cell 15 to protect electrode layers 40 and 60 from degrading during normal use of of cell 12. These layers, and as well, the electrolytic layer 50, may be moisture sensitive and lose a portion of their electrochemical properties if exposed to ambient moisture, which can be as high as about 75% relative humidity. In particular, zinc anode 60 may corrode if exposed to ambient water vapor. Moisture barrier layer 80 of the invention, as illustrated schematically in FIG. 2, covers all exposed portions of tester 15 and protects the tester from exposure to ambient moisture.

Moisture barrier layer 80 used to encase tester electrodes 40 and 60, advantageously may be a film having a thickness of less than about 5 mil (0.13 mm), preferably a thickness between about 0.1 and 2 mil (0.0025 and 0.05 mm), more preferably between about 0.3 and 0.8 mils (0.008 and 0.02 mm). Moisture barrier layer 80 must be transparent or at least translucent enough to allow a sufficient view of fluorescent coating 42 when anode layer 60 has disintegrated. Moisture barrier layer 80 should also be flexible enough to permit some necessary bending as it is applied over tester 15, particularly at the juncture between the tester 15 and cell wall 35. Preferably moisture barrier layer 80 should be flexible enough that it will not crack if bent at angles up to 90°. Moisture barrier layer 80 desirably has a low moisture vapor transmission rate (MVTR) less than 0.02 gm $H_2O \times mm/(m^2 \times 24$ hrs), preferably less than 0.004 gm $H_2O \times mm/(m^2 \times 24$ hrs), more preferably between about 0.0 and 0.0004 gm $H_2O \times mm/(m^2 \times 24$ hrs).

Figure 2A:
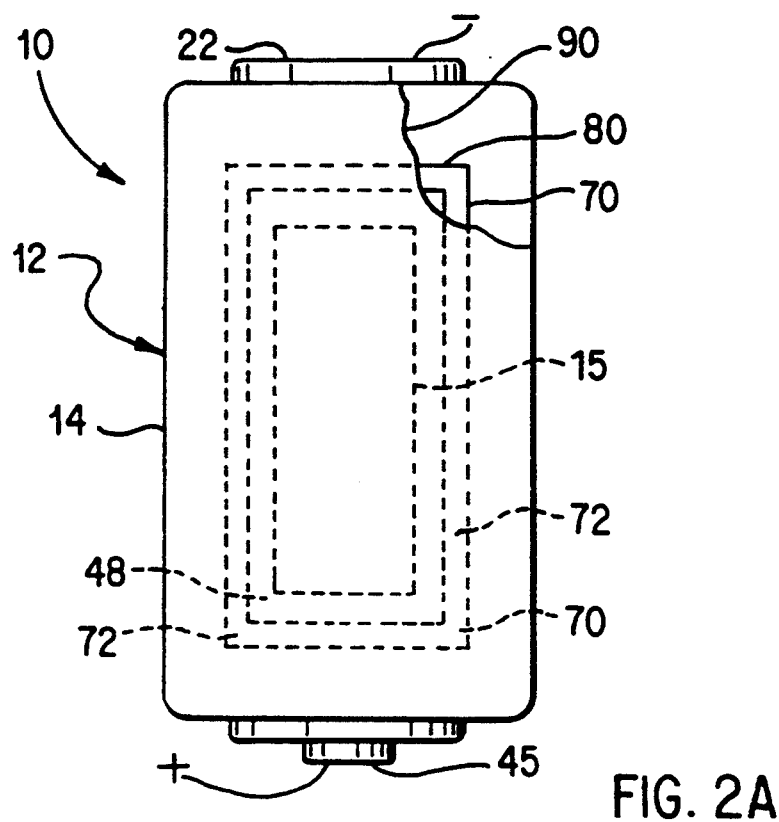
FIG. 2A is a front elevational and partial view of the combined cell and battery tester of FIG. 2.

It has been determined that a thin film of the mineral mica exhibits sufficiently high moisture vapor barrier properties, and is sufficiently optically clear and flexible that it may be used advantageously for moisture barrier layer 80. Moisture barrier layer 80 may be coated on one side along its border 72 with moisture resistant (hydrophobic) adhesive coating 70, as best illustrated in FIG. 2A. Adhesive coating 70 may typically have a width of at least about 0.1 inch (0.25 cm) and preferably 0.2 inches (0.5 cm) along the border of the inside surface of barrier layer 80 surrounding tester 15. The adhesive coated barrier layer 80 is applied directly over tester 15 and is adhesively secured to the outside surface of cell wall 35 by pressing the adhesive coated border 72 of layer 80 against cell wall 35. In such case the adhesive coating 70 preferably does not contact tester 15. As the adhesive coated border 72 becomes bonded to cell wall 35, moisture barrier layer 80 thereby tightly covers and protects tester 15 from exposure to detrimental amounts of ambient moisture. Specifically, moisture barrier layer 80 prevents transmission of moisture in the transverse direction, that is, through the barrier layer 80 thickness. Adhesive coating 70 prevents transmission of moisture in the parallel direction, that is, through the adhesive coating width. (A coating width of at least 0.1 in. (0.25 cm), preferably about 0.2 in. (0.5 cm) provides a sufficiently long path to prevent transmission of significant water vapor through the moisture resistant adhesive coating 70.)

Protective film 90 which is typically a heat shrinkable plastic film, for example, a polyvinylchloride film, is applied over cell wall 35 in a conventional manner to form the battery label. Protective film 90 also covers and protects the exposed surface of moisture barrier layer 80 as film 90 is wrapped around cell wall 35.

The preferred composition for moisture barrier layer 80 is a sheet of mica. Mica is a class of naturally occurring minerals which are typically a complex hydrous aluminum silicate. Synthetic mica, for example, fluorophlogopite, is also known. Mica is constructed of extremely thin transparent cleavage flakes, characterized by near perfect basal cleavage to readily produce flexible, tough, thin laminae. Mica is known primarily for its electrical and heat resistant properties. It is conventionally employed in the electronics industry as an electrical insulator (dielectric), for example, in capacitors. The moisture vapor barrier properties of mica film are not believed to be appreciated by those of ordinary skill in the art. (See, e.g., Kirk-Othmer, Encyclopedia of Chemical Technology, Third Edition, Vol. 15, pp. 416–439, which is a detailed article on mica and its properties but which makes no mention of its moisture barrier properties.) Applicant has determined that a mica film has the requisite combination of properties for its effective use as a moisture barrier layer 80. Specifically a mica film is optically transparent, flexible and has a very low moisture vapor transmission rate (MVTR).

The moisture vapor transmission rate for a mica film is at least less than 0.0004 gm $H_2O \times mm/(m^2 \times 24$ hrs) and is measurably between about 0.000004 and 0.0004 gm $H_2O \times mm/(m^2 \times 24$ hrs). Mica sheets are commercially available at the preferred thicknesses, for example, from 0.1 to 2 mil (0.0025 to 0.05 mm). Mica is classified chemically into various types. Suitable mica types for the purposes of the application herein described which are commercially available as mica film are muscovite, phlogopite, biotite and lepidolite. Other types of mica which can be employed, but are less readily available are roscoelite, fuchsite, fluorophlogopite, paragonite, anandite, celadonite, clintonite, ephesite, glauconite, hendricksite, illite, margarite, polylithionite, taeniolite, and zinnwaldite. The muscovite mica is preferred as it is more readily available in preferred thickness ranges from about 0.1 to 2 mils (0.0025 to 0.05 mm). Muscovite mica has the chemical formula $K_2Al_4(Al_2Si_6O_{20})(OH)_4$ and it is commercially available in thin sheets under the trade designation "NATURAL MUSCOVITE MICA" from B & M Trading Inc of Flushing New York.

As an alternative to mica for moisture barrier layer 80, it is possible to employ flexible film laminates which contain a layer of glass. Glass has the requisite moisture vapor barrier properties, however, glass alone is too brittle for the present application. It is therefore desirable to form a thin film laminate containing a thin coating of glass on a flexible polymeric substrate, preferably a polyolefin substrate. Accordingly, one such glass coated polymeric film which could be used for moisture vapor barrier layer 80 is available under the trademark TRANSFLEX" from Flex Products, Inc., Santa Rosa, Calif. The "TRANSFLEX" laminate-film is a glass coated polypropylene film. It is optically clear, flexible and has good moisture vapor barrier properties, but not as good as mica sheets. The moisture vapor transmission rate (MVTR) for the "TRANSFLEX" film is about 0.015 gm $H_2O \times mm/(m^2 \times 24$ hrs). Since this is a higher MVTR than the MVTR rating for mica, "TRANSFLEX" film is less preferred than mica. If "TRANSFLEX" film were employed for moisture barrier layer 80, its thickness would preferably be about 2 mils (0.05 mm) to give adequate moisture vapor barrier properties. Although such thicknesses are at the high end of the aforementioned preferred range, such thicknesses could, nonetheless, be employed for moisture barrier layer 80 within the context of the present application. The types of glasses that may be employed in glass coated plastic film include soda lime, borosilicate, aluminosilicate, lead glasses, borate glasses, phosphate glasses, vitreous silicia and lead-tin fluorophosphate.

Another alternative for moisture barrier layer 80 is a film formed of vapor deposited polyparaxylylene employing the "PARYLENE" process from Union Carbide, Danbury, Conn. Although polyparaxylylene film has the requisite properties of optical clarity, flexibility and low moisture vapor transmission rates, i.e., less than 0.02 gm $H_2O \times mm/(m^2 \times 24$ hrs), it has a disadvantage that it is more costly to manufacture. The process of its manufacture, for example, is a slow batch process involving several reaction control steps. Polyparaxylylene film, nonetheless, has the requisite combination of properties that permit its effective use as a suitable composition for moisture barrier layer 80.

Adhesive layer 70, which bonds moisture vapor barrier layer 80 to the cell wall 35, should be of a hydrophobic type and have a relatively low moisture vapor transmission rate (MVTR) of less than about 2 gm $H_2O \times mm/(m^2 \times 24$ hrs) and preferably less than about 0.2 gm $H_2O \times mil/(m^2 \times 24$ hrs). In this range the adhesive layer 70 may be coated along border 72 of the surface of barrier layer 80 facing cell wall 35. The width of adhesive border 72 should desirably be at least about 0.1 in. (0.25 cm) and preferably about 0.2 in. (0.5 cm) to prevent any measurable amount of water vapor from entering tester 15 through the width of border 72. Adhesive layer 70 itself preferably has a thickness of less than about 5 mils. There may or may not be a small gap 48 between the peripheral edge of indicator cell 15 and adhesive border 72. Any microscopic pockets of air entrapped within gap 48 will not contain enough water vapor to noticeably affect the shelf-life of tester 15. The extent of the gap, therefore, if it exists, is not critical but preferably is not greater than about 0.2 inches (0.5 om) width.

Although the preferred range for the moisture vapor transmission rate for adhesive layer 70 is between 0.04 and 2 gm $H_2O \times mm/(m^2 \times 24$ hrs), it is clear that adhesives having moisture vapor transmission rates less than 0.04 gm $\times mm/(m^2 \times 24$ hrs) would also be suitable, provided they are hydrophobic, easy to apply in the widths and thicknesses aforementioned, and are capable of bonding moisture barrier layer 80 to cell wall 35.

Suitable adhesives having the desired properties can be selected from a variety of hydrophobic hot melt and hydrophobic solvent based adhesives. If mica film is employed for moisture barrier layer 80 and cell wall 35 is nickel-plated steel, then, because of the polar nature of these two surfaces, the adhesive bonding properties of conventional hot melt and solvent based adhesives can be improved by adding a small amount of a maleic anhydride modified polymer. A modified polymer of such type is available under the trade designation "VESTOPLAST V3645" polymer from Huls, Inc., Piscataway, N.J. Alternatively, the mica film (80) and steel surface (35) could be treated with bifunctional primers designed to couple the adhesive to the mica or steel. Non exclusive examples of suitable primers are "KENREACT KRTTS" (isopropyl triisosteroyl titanate) from Kenriich Petrochemicals Inc., Bayonne, N.J.) and "HULS PS078.5" (triethoxy sily) modified polybutadiene from Huls America, Piscatoway N.J. The primers are applied directly to the clean mica and/or steel surface from a diluted solution (0.5%–1.0% in hexane for example) and allowed to dry and react. A variety of hydrophobic hot melt and solvent based adhesive formulations are suitable for adhesive layer 70. Suitable hot melt adhesives may have as a principal component a polyolefin, for example, polyethylene, polypropylene, polybutene, polyhexene and mixtures thereof. The polyolefin may be in the form of a homopolymer or a copolymer. The hot melt adhesive components (Table 1) are melted and mixed until a uniform mixture is obtained. The mixture is melted and applied hot, typically by employing conventional extrusion equipment or as a prefabricated hot melt adhesive film. The hot melt adhesive may conveniently be applied to either one or both surfaces of cell wall 35 and moisture barrier layer 80, preferably along a border area 72 (Fig. 2A) of moisture barrier layer 80. The two surfaces may then be pressed together and allowed to cool, whereupon a strong adhesive bond develops.

Alternatively the hot melt adhesive 70 may be available in the form of a dry adhesive film. In this case the adhesive film may be applied between moisture barrier layer 80 and cell wall 35, preferably along border area 72. A hot platen or the like may then be applied to the outside surface of moisture barrier layer 80, whereupon the underlying adhesive film 70 becomes tacky as it melts and a strong adhesive bond between barrier layer 80 and cell wall 35 develops as the adhesive cools. A suitable hot melt dry adhesive film 70 may be selected from a variety of compositions, but preferably contains a polyolefin. A preferred composition, however, for a dry hot melt adhesive film 70 contains a high propene polyalphaolefin resin such as VESTOPLAST 750 resin (Huls Inc., Piscataway, N.J.), a saturated aliphatic tackifier such as ESCOREZ 5340 tackifying resin (Exxon Corp.) and a antioxidant, preferably a high molecular weight antioxidant such as IRGANOX 1010 antioxidant (Ciba-Geigy Corp.). A preferred formulation for adhesive film 70 contains VESTOPLAST 750 resin (74.8 wt. %), ESCOREZ 5340 tackifying resin (25 wt. %) and IRGANOX 1010 antioxidant (0.2 wt. %). This composition will become tacky by applying a hot platen at about 130° C. for about 5 seconds. The hot melt adhesive film 70 may typically have a thickness of between about 2 and 5 mils (0.05 and 0.13 mm).

If a solvent based adhesive is desired it may be selected from hydrophobic solvent based adhesive systems having relatively low moisture vapor transmission rates, e.g., below 2 gm $H_2O \times mm/(m^2 24$ hrs). Preferred solvent based hydrophobic adhesives which have suitably low moisture vapor transmission rates include hydrophobic rubber based adhesives for example, butyl, polychloroprene ("NEOPRENE"), nitrile, polyisoprene, polyisobutylene, polysulfide, styrene-butadiene, styrene-isoprene-styrene (SIS) block copolymer and acrylonitrile-styrene-butadiene (ASB) block copolymer and mixtures thereof. The solvent based adhesive is prepared by mixing the components of any given formulation (Table 2) in specified solvent at ambient temperature using conventional electric mixers. The solvent based adhesive may then be applied by brush or spray to either one or both surfaces of moisture barrier layer 80 and cell wall 35, preferably along border area 72 of one side of moisture barrier layer 80. The adhesive coated surfaces may be exposed to ambient or hot air for a brief period to enable the solvent to evaporate and render the adhesive coating tacky. The two surfaces are then pressed together and a strong adhesive bond develops.

Preferred hot melt adhesive formulations for adhesive layer 70 are given in Table 1. Each component listed in Table 1 may be present in each respective formulation within a range of at least 5 percent by weight of the amounts shown. Preferred solvent based adhesive formulations for adhesive layer 70 are given in Table 2.

TABLE 1

HOT MELT ADHESIVE FORMULATIONS

| FORMULATION: | 1 WT % | 2 WT % | 3 WT % | 4 WT % |
|---|---|---|---|---|
| [1]VESTOPLAST 703 | 74.8 | | | |
| [2]VESTOPLAST V3645 | | | | 74.8 |
| [3]ESCOREZ 5300 | 25.0 | | 30.0 | |
| [4]ESCOREZ 5320 | | 30.0 | | 25.0 |
| [5]IRGANOX 1010 | 0.2 | 0.2 | 0.2 | 0.2 |
| [6]EASTOFLEX D134 | | 69.8 | | |
| [7]EASTOFLEX P1824008 | | | 69.8 | |
| TOTAL | 100.0 | 100.0 | 100.0 | 100.0 |

Notes:
1. VESTOPLAST 703 is an ethylene-propene-butene terpolymer available from Huls, Inc., Piscataway, N.J.
2. VESTOPLAST V3645 is a maleic anhydride modified ethylene-propene-butene terpolymer available from Huls, Inc., Piscataway, N.J.
3. ESCOREZ 5300 is a saturated aliphatic tackifying resin from EXXON Corp.
4. ESCOREZ 5320 is a saturated aliphatic tackifying resin from EXXON Corp.
5. IRGANOX 1010 is tetrakis[methylene(3,5,-di-tert-butyl-4-hydroxyhydrocinnamate)]methane, which is a high molecular weight multifunctional antioxidant from Ciba-Geigy Corp.
6. EASTOFLEX D134 is a propylene-hexene copolymer resin from Eastman Kodak Chemical Co.
7. EASTOFLEX P1824008 is a maleic anhydride modified propylene-hexene copolymer from Eastman Kodak Co.

TABLE 2

SOLVENT BASED ADHESIVE FORMULATIONS

| FORMULATION: | 5 WT % | 6 WT % | 7 WT % |
|---|---|---|---|
| [1]Styrene-butadiene/alpha methyl styrene polymer dissolved in trichloroethane solvent. | 100.0 | | |
| [2]Polyisoprene-butyl rubber copolymer dissolved in heptene. | | 100.0 | |
| [3]Maleic-anhydride modified solvent based adhesive. | | | 100.0 |

NOTES:
1. Styrene-butadiene with alpha methyl styrene polymer dissolved in 1,1,1 trichloroethane solvent, available as FASTBOND 47NF clear foam adhesive from 3M Corp.
2. Available as KALENE 1300 which is polyisoprene-butyl rubber copolymer (30 wt %) dissolved in heptane (70 wt %) available from Hardman, Inc.
3. Mixture of VESTOPLAST V3645 (15 wt %) a maleic anhydride modified ethylene-propene-butene-terpolymer available from Huls, Inc., Piscataway, N.J. and ESCOREZ 5320 (5 wt %) a saturated aliphatic resin from Exxon Corp. dissolved in toluene (20 wt %).

Alternatively, a reactive thermosetting adhesive system can be used to form adhesive layer 70 instead of the hot melt or solvent based adhesives aforementioned. A preferred reactive adhesive may be formed with the composition shown in Table 3.

TABLE 3

REACTIVE ADHESIVE

| FORMULATION: | 7 WT % |
|---|---|
| 1,2 polybutadiene (liquid) | 98 |
| Benzoyl peroxide | 2 |
| Total | 100 |

NOTES:
1. 1,2 polybutadiene (liquid) is available as RICON 156 polymer from Ricon Resins Co., Grand Junction, Colorado.

The reactive adhesive (Formulation 7) shown in Table 3 may be applied as adhesive layer 70 by coating the reactive mixture onto one side of moisture barrier layer 80 around its border 72 preferably in a coating width of about 0.2 inches (0.5 cm). Moisture barrier film 80 is then applied over tester 15 with the adhesive coated border 72 contacting cell wall 35. After the adhesive coating is cured by subjecting it to convective heat at 150° C. for about 2 hours whereby a strong adhesive bond is formed between moisture barrier layer 80 and cell wall 35. The cured reactive adhesive is hydrophobic and has a low moisture vapor transmission rate of less than about 0.2 gm $H_2O \times mm/(m^2 \times 24$ hrs) preventing measurable water vapor from reaching tester 15 through the width of adhesive border 72.

Although the moisture barrier and adhesive sealing aspects of the present invention have been described with reference to a preferred embodiment illustrating an electrochemical-type tester, the invention is not intended to be limited only to such testers. The disclosed moisture barrier layer 80 and adhesive layer 70 are equally suitable for use in like manner to protect other moisture sensitive film-like battery testers which may be attached to an electrochemical cell. The moisture barrier layer and adhesive of the present invention could also be employed to prevent moisture from penetrating electronic devices employing liquid crystal (LCD) or light emitting diode (LED) displays. Accordingly, the present invention is not intended to be limited to the specific embodiments, but rather is defined by the claims and equivalents thereof.

What is claimed is:

1. The combination of an electrochemical cell and a cell condition indicator, said indicator having at least one moisture sensitive component; wherein said electrochemical cell comprises a casing, a negative terminal, and a positive terminal; wherein said condition indicator comprises an indicator cell comprises an anode layer, a cathode layer, and an electrolyte in operative association with each other; and wherein said condition indicator is located proximally adjacent the outside surface of said casing; the combination further comprising a moisture barrier covering said indicator cell; and wherein at least one of the anode and cathode of said indicator cell provides a visually discernible indication of the condition of said electrochemical cell.

2. The combination of claim 1 wherein the moisture barrier has a moisture vapor transmission rate of less than about 0.02 gm $H_2O \times mm/(m^2 \times 24\ hrs)$.

3. The combination of claim 1 wherein said moisture barrier comprises a film and an adhesive, wherein said adhesive is applied between at least a peripheral portion of said film and the outside surface of the electrochemical cell thereby encasing said indicator.

4. The combination of claim 1 wherein said indicator is visible through said moisture barrier.

5. The combination of an electrochemical cell and a cell condition indicator, said indicator having at least one moisture sensitive component; wherein said electrochemical cell comprises a casing, a negative terminal, and a positive terminal; wherein said condition indicator comprises an indicator cell including a film-laminate comprising an anode layer, a cathode layer and an electrolyte layer in operative association with each other; and wherein said condition indicator is located proximally adjacent the outside surface of said casing; the combination further comprising a moisture barrier protecting said indicator cell; and wherein at least one of the anode and cathode of said indicator cell provides a visual indication of the condition of said electrochemical cell.

6. The combination of an electrochemical cell and a cell condition indicator, said indicator having at least one moisture sensitive component; wherein said electrochemical cell comprises a casing, a negative terminal, and a positive terminal; wherein said condition indicator comprises an indicator cell comprising an anode layer, a cathode layer, and an electrolyte layer in operative association with each other; and wherein said condition indicator is located proximally adjacent the outside surface of said casing; and wherein said cell condition indicator has a thickness of less than about 10 mils (0.25 mm) and is electrically connected in parallel to said electrochemical cell, the combination further comprising a moisture barrier covering said indicator cell, and wherein at least one of the electrodes of said indicator cell becomes altered as said electrochemical cell discharges and whereby observation of the resulting altered electrode through said moisture barrier provides a visual indication of the state of charge of the electrochemical cell.

7. The combination of claim 1 wherein the condition indicator has a thickness of less than about 10 mils (0.25 mm).

8. The combination of claim 1 wherein the moisture barrier has a degree of flexibility such that it does not crack if bent to an angle up to about 90 degrees.

9. The combination of claim 1 wherein the moisture barrier has a moisture vapor transmission rate of less than about 0.0004 gm $H20 \times mm/(m2 \times 24\ hrs)$.

10. The combination of claim 1 wherein the moisture barrier further has a thickness between about 0.1 and 5 mils (0.0025 and 0.13 mm).

11. The combination of claim 1 wherein the moisture barrier comprises a film selected from the group consisting of mica, polyparaxylylene, and glass coated polymeric films.

12. The combination of claim 1 wherein the moisture barrier comprises mica.

13. The combination of claim 1 wherein the moisture barrier comprises mica selected from the group consisting of muscovite, phlogopite, biotite, lepidolite, roscoelite, fuchsite, fluorophlogopite, paragonite, anandite, celadonite, clintonite, ephesite, glauconite, hendricksite, illite, margarite, polylithionite, taeniolite, and zinnwaldite.

14. The combination of claim 1 wherein the moisture barrier comprises glass coated polymeric film.

15. The combination of claim 1 further comprising a heat shrinkable polymeric film applied over the moisture barrier and around at least a substantial portion of the electrochemical cell outer surface.

16. The combination of claim 6 wherein said indicator anode comprises zinc and said indicator cathode comprises manganese dioxide.

17. The combination of an electrochemical cell and a cell condition indicator in contact with said electrochemical cell; said electrochemical cell comprising an outer surface, a negative terminal and a positive terminal and said indicator comprising a film-laminate including an anode layer, a cathode layer and electrolyte in operative association with each other; and wherein said anode layer is electrically connected to said negative terminal and said cathode layer is electrically connected to said positive terminal; the combination further comprising a moisture barrier film covering the indicator, a hydrophobic adhesive layer between at least a portion of the moisture barrier film and electrochemical cell outer surface to bond the moisture barrier film to said electrochemical cell wherein the moisture barrier film has a moisture vapor transmission rate of less than about 0.02 gm $H_2O \times mm/(m^2 \times 24\ hrs)$ and said adhesive layer has a moisture vapor transmission rate less than about 2 gm $H_2O \times mm/(m^2 \times 24\ hrs)$.

18. The combination of claim 17 wherein the moisture barrier film is flexible and has a degree of clarity which is at least translucent.

19. The combination of claim 17 wherein the moisture vapor barrier film has a thickness of less than about 5 mil (0.13 mm) and the adhesive layer is coated along the border of a surface of said moisture barrier film.

20. The combination of claim 17 wherein the adhesive layer comprises a hot melt polyolefinic adhesive.

21. The combination of claim 20 wherein the hot melt adhesive is selected from the group consisting of polyethylene, polypropylene, polybutene and polyhexene and copolymers thereof.

22. The combination of claim 20 wherein the hot melt polyolefin adhesive is applied in the form of a dry film which is subsequently heated to tackify the adhesive.

23. The combination of claim 17 wherein the adhesive layer comprises a rubber based adhesive selected from the group consisting of butyl, polychloroprene, nitrile, polyisoprene, polyisobutylene, polysulfide, styrene-butadiene, styrene-isoprene-styrene block copolymer, styrene-butadiene-styrene block copolymer and acrylonitrile-styrene-butadiene block copolymer.

24. The combination of claim 17 wherein the moisture barrier film is selected from the group consisting of mica, polyparaxylylene and glass coated polyolefin.

25. The combination of claim 17 wherein the moisture barrier film comprises mica.

* * * * *